United States Patent
Dugan (10) Patent No.: US 11,129,003 B2
(45) Date of Patent: *Sep. 21, 2021

(54) METHODS AND APPARATUS FOR NEWS DELIVERY

(71) Applicant: Dugan Patents, LLC, Sleepy Hollow, NY (US)

(72) Inventor: Brian M. Dugan, Sleepy Hollow, NY (US)

(73) Assignee: Dugan Patents, LLC, Sleepy Hollow, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,183

(22) Filed: Aug. 27, 2018

(65) Prior Publication Data

US 2018/0367972 A1    Dec. 20, 2018

Related U.S. Application Data

(63) Continuation of application No. 14/604,670, filed on Jan. 23, 2015, now Pat. No. 10,063,992.

(60) Provisional application No. 61/930,942, filed on Jan. 23, 2014.

(51) Int. Cl.
*H04W 4/60* (2018.01)
*H04W 4/21* (2018.01)

(52) U.S. Cl.
CPC .............. *H04W 4/60* (2018.02); *H04W 4/21* (2018.02)

(58) Field of Classification Search
None
See application file for complete search history.

(56) References Cited

U.S. PATENT DOCUMENTS

| | | | |
|---|---|---|---|
| 5,832,212 A | 11/1998 | Cragun | |
| 5,996,011 A | 11/1999 | Humes | |
| 6,493,744 B1 | 12/2002 | Emens | |
| 9,336,204 B1 | 5/2016 | Amundsen | |
| 2003/0130837 A1* | 7/2003 | Batchilo | G06F 17/2715 704/9 |
| 2005/0108227 A1 | 5/2005 | Russell-Falla | |
| 2006/0004716 A1 | 1/2006 | Hurst-Hiller | |
| 2006/0116860 A1* | 6/2006 | Kaplan | G06F 17/2745 704/1 |
| 2007/0214454 A1* | 9/2007 | Edwards | G06F 16/957 717/176 |
| 2007/0297641 A1 | 12/2007 | Criddle | |

(Continued)

OTHER PUBLICATIONS

Office Action of U.S. Appl. No. 14/604,670 dated Sep. 4, 2015.

(Continued)

*Primary Examiner* — Aleksandr Kerzhner
*Assistant Examiner* — Eddy Cheung
(74) *Attorney, Agent, or Firm* — Dugan & Dugan, PC (57) ABSTRACT

In some embodiments, a method is provided that includes (1) prompting a user to identify news content to be filtered; (2) generating filter rules based on the content to be filtered identified by the user; (3) populating a rules database based on the filter rules; (4) retrieving news content from a news server over the internet; (5) filtering the news content based on the filter rules within the rules database; and (6) providing the filtered news content to the user on a mobile device of the user. Numerous other embodiments are provided.

19 Claims, 4 Drawing Sheets

---

404

SUGGESTED FILTERING OF CONTENT

\*\*Breaking News\*\* - police made a ~~grisly~~ discovery after searching the home of suspected serial killer John Doe. Upon entering the suspect's home, police found the ~~dismembered~~ remains of several dozen scarecrows. ~~Hands, legs and heads hung from meat hooks and showed obvious signs of trauma. Some of the scarecrows were so badly burned they could only be identified through dental records.~~ Doe could be heard ~~screaming~~ saying "they are only made of straw" as he was hauled away.

SOURCE ARTICLE: www.123news.com/123843/btw/2adc

406

(56) References Cited

U.S. PATENT DOCUMENTS

| | | | |
|---|---|---|---|
| 2008/0168149 A1* | 7/2008 | Daniell | H04L 51/04 |
| | | | 709/206 |
| 2009/0006950 A1 | 1/2009 | Gross | |
| 2010/0287033 A1 | 11/2010 | Mathur | |
| 2011/0092221 A1* | 4/2011 | Zubas | H04W 4/021 |
| | | | 455/456.1 |
| 2015/0095354 A1 | 4/2015 | Miller | |
| 2015/0208192 A1 | 7/2015 | Dugan | |

OTHER PUBLICATIONS

Jan. 4, 2016 Reply to Sep. 4, 2015 Office Action of U.S. Appl. No. 14/604,670.

Final Office Action of U.S. Appl. No. 14/604,670 dated Mar. 16, 2016.

Jul. 18, 2016 Notice of Appeal and Reply to Mar. 16, 2016 Final Office Action and of U.S. Appl. No. 14/604,670.

Advisory Action of U.S. Appl. No. 14/604,670 dated Aug. 4, 2016.

Applicant-Initiated Interview Summary of U.S. Appl. No. 14/604,670 dated Dec. 13, 2016.

Amendment Submitted with Filing of RCE of U.S. Appl. No. 14/604,670, filed Dec. 19, 2016.

Office Action of U.S. Appl. No. 14/604,670 dated Aug. 3, 2017.

Nov. 3, 2017 Reply to Aug. 3, 2017 Office Action of U.S. Appl. No. 14/604,670.

Notice of Allowance of U.S. Appl. No. 14/604,670 dated Apr. 27, 2018.

* cited by examiner

| RULE ID | RULE TYPE | KEYWORD | ACTION TAKEN |
|---|---|---|---|
| 001 | ANY | grisly | delete word 216a |
| 002 | ANY | dismember | delete word |
| 003 | ANY | screaming | Replace with "saying" |
| 004 | ANY | trauma | delete sentence |
| 005 | ANY | dental records | delete sentence |
| 006 | CHILD | "foul language" | Replace language |
| 007 | ANY | murder | Translate sentence |

UNFILTERED CONTENT — 402

\*\*Breaking News\*\* - police made a grisly discovery after searching the home of suspected serial killer John Doe. Upon entering the suspect's home, police found the dismembered remains of several dozen scarecrows. Hands, legs and heads hung from meat hooks and showed obvious signs of trauma. Some of the scarecrows were so badly burned they could only be identified through dental records. Doe could be heard screaming "they are only made of straw" as he was hauled away.

FIG. 4A

SUGGESTED FILTERING OF CONTENT — 404

\*\*Breaking News\*\* - police made a ~~grisly~~ discovery after searching the home of suspected serial killer John Doe. Upon entering the suspect's home, police found the ~~dismembered~~ remains of several dozen scarecrows. ~~Hands, legs and heads hung from meat hooks and showed obvious signs of trauma. Some of the scarecrows were so badly burned they could only be identified through dental records.~~ Doe could be heard ~~screaming~~ saying "they are only made of straw" as he was hauled away.

SOURCE ARTICLE: www.123news.com/123843/btw/2adc — 406

FIG. 4B

FILTERED CONTENT — 408

\*\*Breaking News\*\* - police made a discovery after searching the home of suspected serial killer John Doe. Upon entering the suspect's home, police found the remains of several dozen scarecrows. Doe could be heard saying "they are only made of straw" as he was hauled away.

SOURCE ARTICLE: www.123news.com/123843/btw/2adc — 406

FIG. 4C

METHODS AND APPARATUS FOR NEWS DELIVERY

This application is a continuation of and claims priority to U.S. patent application Ser. No. 14/604,670 filed Jan. 23, 2015, and titled "METHODS AND APPARATUS FOR NEWS DELIVERY", which claims priority to U.S. Provisional Patent Application No. 61/930,942, filed on Jan. 23, 2014, and entitled "METHODS AND APPARATUS FOR NEWS DELIVERY". Each of the above applications is hereby incorporated herein by reference in its entirety for all purposes.

FIELD

The present application relates to content delivery, and more particularly to methods and apparatus for news delivery.

BACKGROUND

There are numerous sources of news available on the Internet. However, much of the news content provided by news agencies is sensationalized, graphic, depressing and/or otherwise undesirable. This makes it difficult for users to keep abreast of current events without being exposed to content the users may not want to see. As such, a need exists for methods and apparatus for obtaining news over the Internet without being exposed to undesirable content.

SUMMARY

In some embodiments, a method is provided that includes (1) prompting a user to identify news content to be filtered; (2) generating filter rules based on the content to be filtered identified by the user; (3) populating a rules database based on the filter rules; (4) retrieving news content from a news server over the internet; (5) filtering the news content based on the filter rules within the rules database; and (6) providing the filtered news content to the user on a mobile device of the user. Numerous other embodiments are provided.

Other features and aspects of the present invention will become more fully apparent from the following detailed description of example embodiments, the appended claims, and the accompanying drawings.

DETAILED DESCRIPTION

Figure 1:
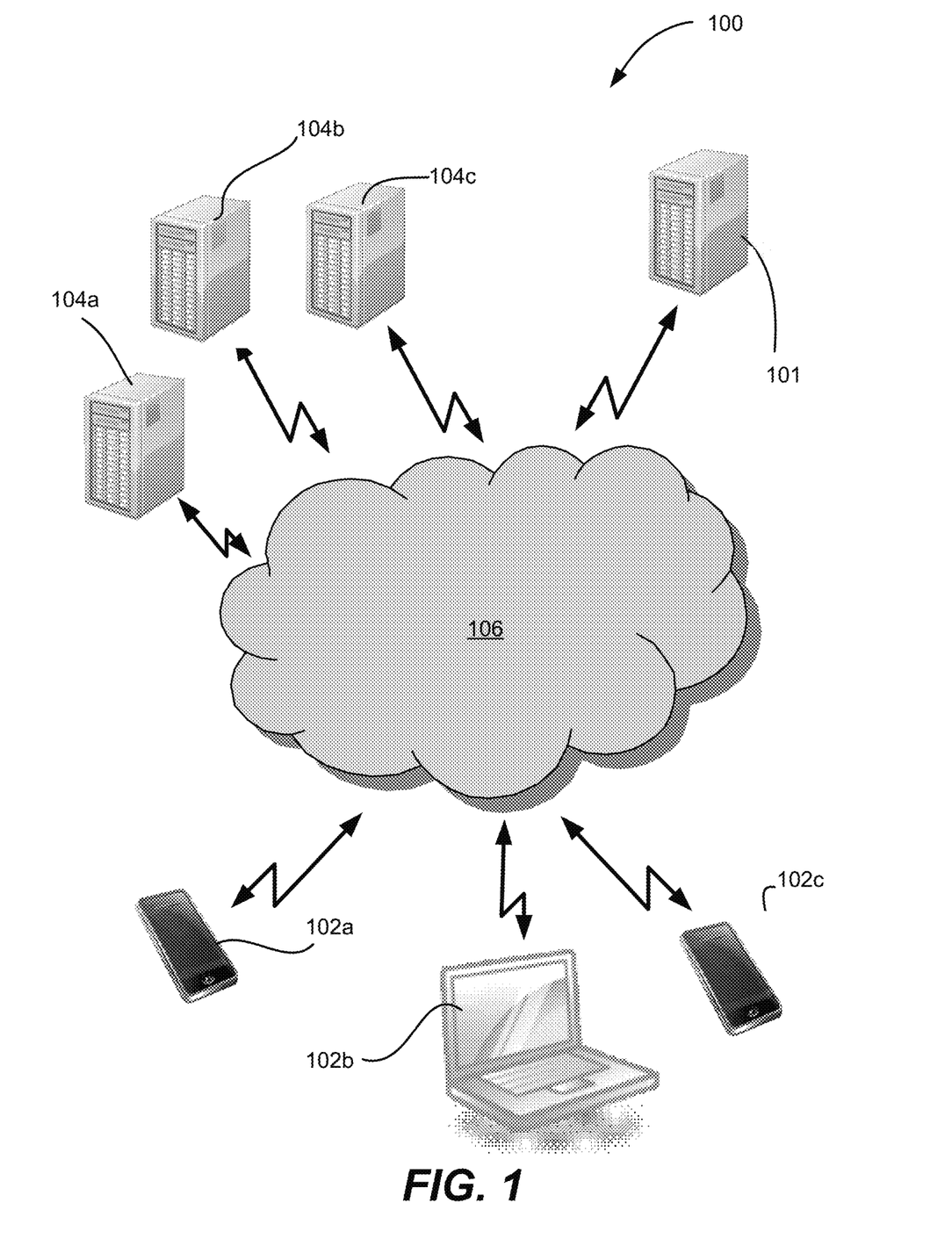
FIG. 1 is a schematic illustration of an example system for providing filtered news content in accordance with one or more embodiments of the invention.

With reference to FIG. 1, in some embodiments, a system 100 is provided that includes a web server 101 that may communicate with one or more user devices 102*a-c* and/or one or more news servers 104*a-c* via the internet and/or world wide web (referred to herein as Internet 106). While three user devices 102*a-c* and three news servers 104*a-c* are shown, it will be understood that any number of user devices 102*a-c* and/or news servers 104*a-c* may be employed.

The user devices 102*a-c* may include one or more mobile devices (e.g., cellular telephones, smart phones, tablet computers, laptop computers, smart wristbands, other mobile devices, etc.), one or more computers (e.g., tablet computers, laptop computers, desktop computers, etc.) and/or any other device that may receive information via Internet 106 such as a smart appliance, an internet-enabled automobile, interactive voice response internet appliances such as Echo® manufactured by Amazon.com®, an internet-enabled television or video game player, or the like. News servers 104*a-c* may be web or other servers that contain news or other information (e.g., Wikipedia articles, IMDB pages, Facebook posts, Twitter tweets, etc.) or content such as the web servers hosted by CNN, Google, Yahoo, FoxNews, Huffington Post, the New York Times, or the like. Such news servers 104*a-c* may provide news content via one or more web sites, for example.

Web server 101 may be any suitable computer software and/or hardware having computer program code for performing one or more of the methods described herein. For example, in some embodiments, web server 101 may communicate with one or more news servers 104*a-c* to retrieve news content. News content may include top news stories, business news, entertainment news, local news, world news, weather news, sports news and/or the like. In some embodiments, web server 101 may examine retrieved news content to determine its popularity, subject matter, source, location of a news event, and/or any other relevant characteristics of the retrieved content.

In one or more embodiments web server 101 may filter (e.g., automatically) retrieved news content to remove graphic content, sensationalized content, or any content a user wishes to have removed. For example, a user may not wish to read about and/or view violent images, graphic accounts of animal and/or human suffering, overly detailed accounts of natural disasters, sports outcomes/scores of a game the user intends to watch in the future, television show surprise endings, or any other information that the user finds undesirable. Based on such user selections, the web server 101 may filter, condense and/or summarize retrieved news content so as to inform a user of a news event without providing content the user does not wish to read about, hear about and/or see (e.g., depressing images, graphic accounts and/or pictures, etc.). As an example, a news story may provide a detailed and graphic account of a tragic event in which a large number of people died and/or were injured. A user may wish to know of the event, but not wish to be presented with a detailed account. As such, the web server 101 may retrieve a detailed account of a news event from one of the news servers 104*a-c*, and then filter the news content to retrieve only the information relevant to a user (e.g., type of news event, location of news event, general nature of the news event, whether the news event is ongoing, the number of people affected by the news event, the names of people affected by the news event, etc.).

In some embodiments, the web server 101 may perform keyword or natural language searching of a retrieved news content to identify such desired information, and/or to generate a filtered, condensed and/or summarized version of the retrieved news content for presentation to a user. Such filtering, condensing and/or summarizing may be performed automatically (e.g., via computer program code) and/or manually (e.g., via a company that hosts the web server 101, via one or more users who communicate with the web server 101 via one or more user devices 102*a-c*, via another third party etc.).

In some embodiments, suitable computer program code in the form of an application executing on each user device 102*a-c* may be provided for performing one or more of the methods described herein. For example, an application may be provided on a user device 102*a-c* that allows the user device 102*a-c* to retrieve and/or display filtered, condensed and/or summarized news information from the web server 101 via communication over internet 106. In some embodiments, the application may allow a user to employ a user device 102*a-c* to specify information about the news to be retrieved and displayed on the user device 102*a-c* (e.g., type of news event, location of news event, general nature of the news event, whether the news event is ongoing, the number of people affected by the news event, the names of people affected by the news event, etc.). Further, in some embodiments, the application may allow a user to employ a user device 102*a-c* to retrieve unfiltered, uncondensed and/or unsummarized news information directly from one or more news servers 104*a-c*. In at least one embodiment, the application may filter, condense and/or summarize such retrieved news information through computer program code stored on the user device 102*a-c* (e.g., without interacting with the web server 101). In some embodiments, a user may share filtered, condensed and/or summarized news information with the web server 101 (e.g., which may display such content, share the content with other users, etc.) and/or with other users (e.g., connections in a social network, friends, family, colleagues, etc.).

In some embodiments, an application on a user device 102*a-c* may allow a user to manually edit news information retrieved from news servers 104*a-c* and/or share filtered, condensed and/or summarized news information generated by the user with the web server 101 (e.g., which may display such content, share the content with other users, etc.) and/or with other users (e.g., connections in a social network, friends, family, colleagues, etc.).

Figure 2A:
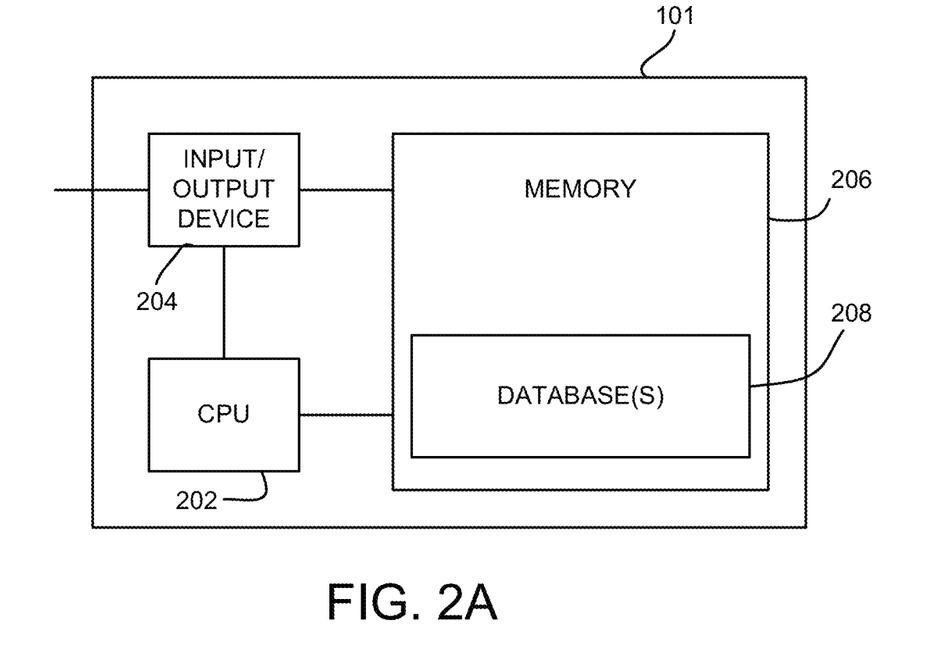
FIG. 2A is a schematic illustration of an example server for providing filtered news content in accordance with one or more embodiments of the invention.

FIG. 2A is an example embodiment of the web server 101 of FIG. 1 provided in accordance with embodiments of the present invention. With reference to FIG. 2A, the web server 101 includes a central processing unit (CPU) 202 coupled to and/or for controlling operation of an input/output device 204 and memory 206. For example, CPU 202 may control the input of content from the Internet 106 (FIG. 1) such as news content, the outputting of content to the Internet 106 such as to one or more of user devices 102*a-c*, the storage of filtered and/or unfiltered news content within memory 206, and/or the like.

CPU 202 may be any suitable processor, microprocessor, controller, microcontroller, or the like. Input/output device 204 may be any suitable communications device such as a high speed Ethernet card. Memory 206 may be any suitable memory such as RAM, DRAM, a hard drive, a solid state drive, or the like.

As shown in FIG. 2A, memory 206 may include one or more databases 208 for assisting in the filtering, summarizing and/or condensing of news content. Other types of data structures may be employed.

Figure 2B:
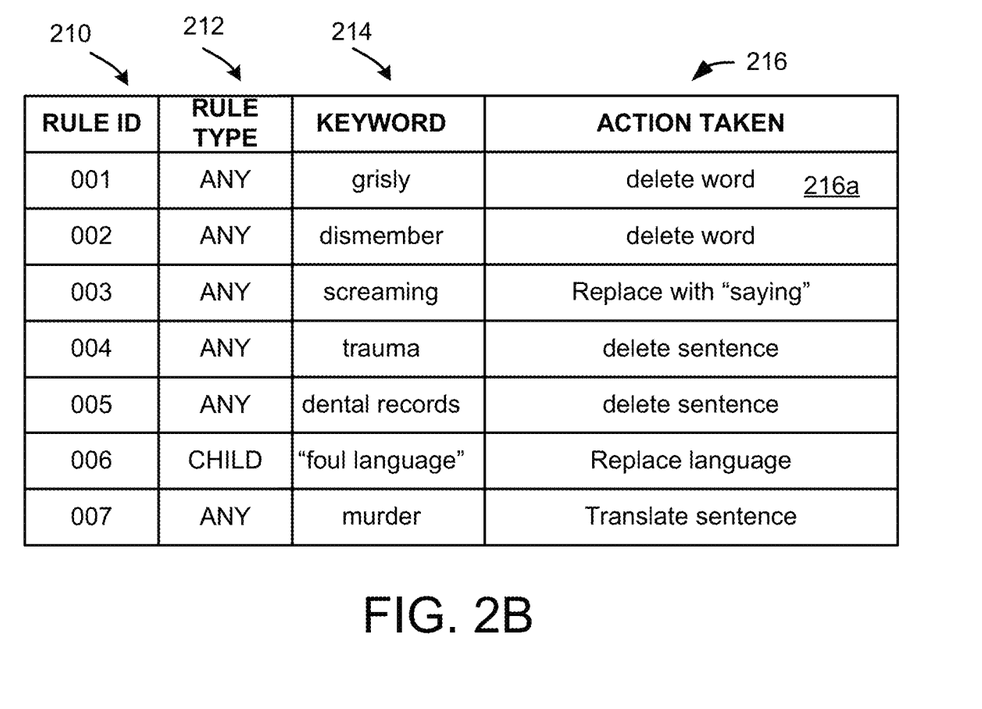
FIG. 2B is a schematic illustration of an example database of the server of FIG. 2A in accordance with one or more embodiments of the invention.

FIG. 2B is an example embodiment of the database 208. Other types and/or sizes of databases may be employed. With reference to FIG. 2B, database 208 is a "rules" database that includes a rule identifier (ID) field 210, a rule type field 212, a keyword field 214 and an action field 216.

In will be understood that these fields are merely examples, and fewer or more fields may be employed.

Rule ID field 210 is used to uniquely identify each rule. Rule type field 212 indicates the type of rule. For example, rules may apply to adults, children, teenagers, men, women, seniors, members of a certain religion, or any other subset of the population. For example, a "child" rule may block, delete, substitute or otherwise filter foul language from a news article. Another example is "any" for a rule that may apply over a wide range of groups. In some embodiments, multiple rule types can be associated with a single rule.

Keyword field 214 indicates words within news content that trigger an action by the web server 101 on the news content (the action being determined by a corresponding action field 216). For example, detecting the word "grisly" in news content may cause the web server 101 to delete the word grisly from the news content (as shown by entry 216*a* in the action field 216), substitute a different word for grisly such as a less offensive synonym, translate grisly to another language, change the color of the word grisly (e.g., to pink), otherwise obscure the text, or the like.

Figure 3:
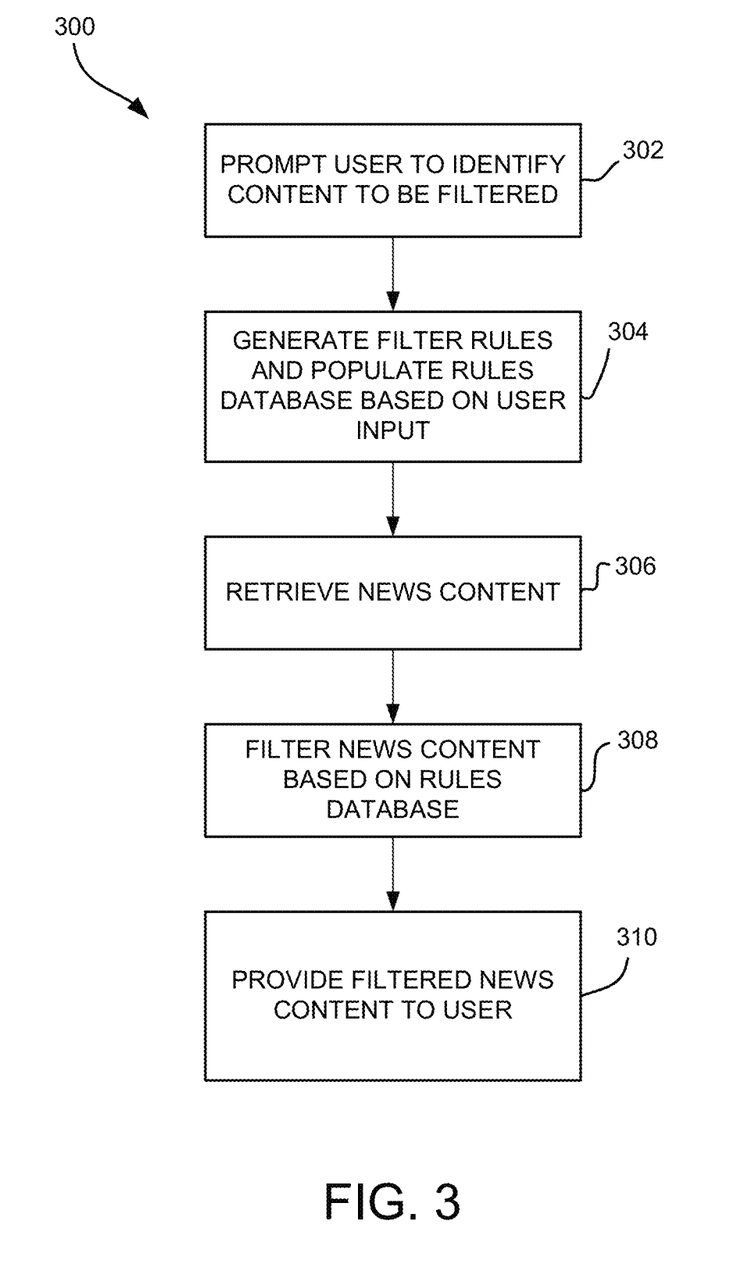
FIG. 3 is a schematic illustration of an example method for providing filtered news content in accordance with one or more embodiments of the invention.

FIG. 3 is an example method 300 of filtering news content in accordance with one or more embodiments of the present invention. With reference to FIG. 3, in Block 302, a user is prompted to identify content he/she wishes to have filtered from news content. For example, the user may be provided a list of words that he/she may find offensive or that are often included in graphic or sensationalized news content, such as foul language, murder, slaughter, suffer, abuse, or the like. Additionally or alternatively, the user may be presented with real or virtual sample news content or other written content that contains graphic, sensationalized or otherwise possibly objectionable material and asked to mark, highlight or remove material the user would not like to receive within future news content. The user may also specify how he/she wants objectionable material filtered. For example, the user may ask to have objectionable language removed, substituted, reduced in size, changed in color, translated to another language or the like. A program similar to a word processor can be used to present the user with the sample news content and using tools such as highlighting, the user can "tag" objectionable content to be filtered. For example, the user can highlight text to be deleted in red; highlight text to be replaced with a synonym in blue; highlight text that is to be translated to French in yellow; highlight text to not be altered in green; etc.

In Block 304 the system can then use the tagged sample content to generate a rules database associated with the user or the user type. For example, based on user input regarding the sample content, rules may be generated and stored within the rules database 208 (associated with the user). For example, if the user indicates that he/she is an adult, rules applicable to children only may be removed from the rules database 208. Likewise, if the user indicates that he/she is a member of a predefined group, such as a religious group, rules may be included within the rules database for the user that have been predetermined for that religious group (e.g., a list of keywords that could be offensive to members of the religious group). Additionally or alternative, keywords or other rules may be created based on user content. For example, if the user indicates that he/she does not wish to receive news content describing murder, a rule may be created that removes all content associated with murder (e.g., a sentence or paragraph with the word murder).

In Block 306, the web server 101 retrieves news content from one or more news servers 104*a-c*. In Block 308, the web server 101 applies the rules within database 208 (for the user) to the retrieved news content to generate filtered news content. For example, the retrieved news content may be filtered according to the rules in database 208 and stored in memory 206 as filtered news content for the user. In Block 310, the filtered news content is provided to the user. For example, the user may employ a smartphone, tablet computer, laptop computer, or the like to access the news content from web server 101. In some embodiments, web server 101 may automatically push filtered news content to the user based on preselected preferences of the user, such as types of news content the user wishes to receive, geographic relevancy of the news information, membership of the user within a group or organization, etc.

Figure 4A:
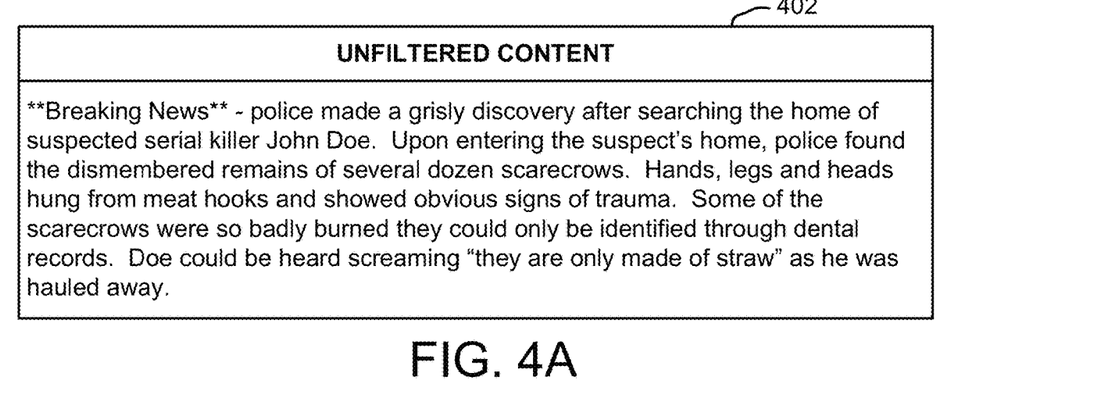
FIGS. 4A-4C illustrate example news content filtered in accordance with one or more embodiments of the invention.
Figure 4B:
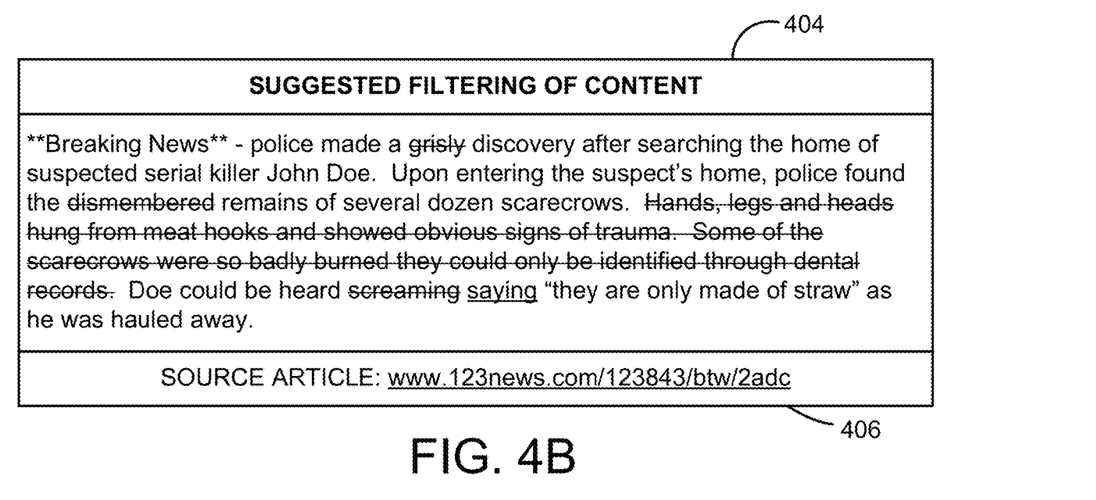
Figure 4C:
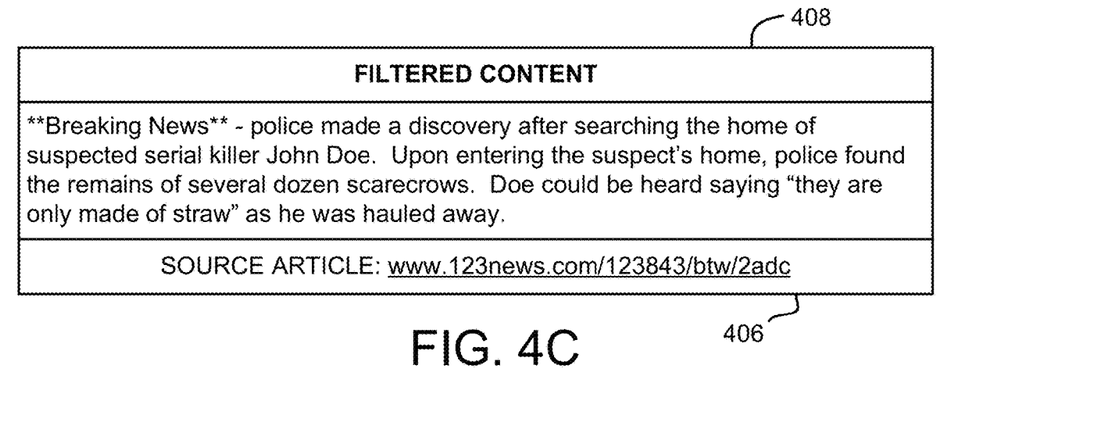

FIG. 4A illustrates example unfiltered content 402 retrieved from one or more news servers 104*a-c*. FIG. 4B illustrates the content 402 with suggested filtering based on rules 001-005 of database 208 (shown as suggested filtered content 404), along with source information 406. For example, according to rules 001 and 002, the word grisly and dismembered should be removed from news content. According to rule 003, the word "screaming" should be replaced with the word "saying." According to rules 004 and 005, any sentences with the words "trauma" or "dental records" should be deleted. FIG. 4C illustrates the content 402 after filtering is applied according to database 208 (to generate content 408).

In some embodiments, users may generate filtered news content, with or without the assistance of a rules database and/or web server 101, and/or store the filtered news content on web server 101. Such filtered news content may be shared with other users in some embodiments. For example, in some embodiments, a user may post news content to the web server 101 and other users may review, confirm or otherwise critique the news content provided by the user. In some, embodiments, if the news content is confirmed by a predetermined number of users, the news content may be shared with other users. Users may be ranked based on accuracy or likability of filtering of news content. In some embodiments, users who obtain a high enough ranking may be designated as trusted editors. For example, trusted editors may be entrusted to control the content and/or dissemination of filtered news content generated by other users.

In some embodiments, web server 101 may track location information of users viewing news content retrieved from web server 101 (e.g., using GPS features of the user devices 102*a-c*, such as GPS features of a cellular telephone). In at least one embodiment, the web server 101 may display information about the number of users who are viewing and/or have viewed a news story, location of users who are viewing and/or have viewed a news story, how rapidly a news story is spreading among users, across a geographic area, across a certain age group of users, or the like. For example, members of a social network may receive information about what news stories have been viewed by other members of the social network.

Computer program code may be developed to execute one or more of the methods described above, and/or such computer code may take the form of an application executable on a mobile device such as a smart phone, tablet computer or the like.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only example embodiments of the invention. Modifications of the above-disclosed apparatus, systems and methods which fall within the scope of the invention will be readily apparent to those of ordinary skill in the art.

Accordingly, while the present invention has been disclosed in connection with example embodiments thereof, it should be understood that other embodiments may fall within the spirit and scope of the invention, as defined by the following claims.

The invention claimed is:

1. A method comprising:
communicating, by a server, a sample story containing content portions associable with filter tags, to a user device;
receiving, by the server, a user preference in a form of a user tagged content portion of the sample story, where the user tagged content portion identifies target content of the sample story for transformative processing;
generating, by the server, a rule based on the user preference, the rule useable to identify within a news story the target content, and to direct the transformative processing of the target content within the news story by altering an appearance of the target content within the news story in accordance with the rule; and
populating, by the server, a rules database based on the rule, the rules database having a plurality of entries, each entry including a keyword field and an action field, wherein the keyword field is useable to identify target content of the news story for transformative processing, and the action field is useable to initiate the transformative processing;
retrieving, by the server, the news story;
detecting, by the server, a match between a keyword field of an entry in the rules database, and a portion of the news story to produce an identified portion of the news story;
initiating, by the server, responsive to detecting the match, the transformative processing specified by the action field;
performing, by the server, the transformative processing on the identified portion of the news story to produce a processed news story; and
storing, by the server, the processed news story.

2. The method of claim 1, further comprising:
communicating the processed news story to the user device.

3. A method comprising:
communicating, by a server, a sample news story containing content portions associable with filter tags, to a first user device;
receiving, by the server, a user preference in a form of a user tagged content portion of the sample news story, where the user tagged content portion identifies objectionable language in the sample news story and specifies how to filter the objectionable language in a subsequent news story;
generating, by the server, a filter rule based on the user preference, the filter rule useable to identify within the subsequent news story the objectionable language, and to direct the filtering of the objectionable language within the subsequent news story by altering an appearance of the objectionable language within the subsequent news story in accordance with the user preference;
populating, by the server, a rules database based on the filter rule, wherein the rules database has at least a keyword field and an action field;
retrieving, by the server, the subsequent news story;
detecting, by the server, a match between the keyword field of the entry in the rules database, and a portion of the subsequent news story;
filtering, by the server, the subsequent news story based on the action field of the entry of the rules database to alter an appearance of the objectionable language within the subsequent news story in accordance with the rules database to generate a filtered news content; and
communicating the filtered news content to the first user device.

4. The method of claim 3, wherein the action field of the entry includes a processing directive selected from a group of processing directives including deletion of text, replacement of text, reducing size of text, and translation of text.

5. The method of claim 4, wherein the processing directive for translation directs translating the objectionable language to a foreign language.

6. The method of claim 3, further comprising: storing, by the server, the filtered news content.

7. The method of claim 3, further comprising: determining, by the server, at least one characteristic of the subsequent news story, wherein the at least one characteristic includes one or more of popularity, subject matter, source, and a location of a news event.

8. The method of claim 3, further comprising: condensing, by the server, the subsequent news story.

9. The method of claim 3, further comprising: summarizing, by the server, the subsequent news story.

10. The method of claim 3, further comprising:
communicating, by the server, the filtered news content to another user device; and
tracking a user reaction at the other user device to the filtered news content.

11. The method of claim 3, wherein the objectionable language includes a sports score.

12. The method of claim 11, wherein the objectionable language includes a television show surprise ending.

13. A system for processing news content, the system comprising:
a processor; and
a memory coupled to the processor, the memory having one or more instructions stored therein that, when executed by the processor, cause the processor to:
communicate a sample story containing content portions associable with filter tags to a user device;
receive one or more user preferences in a form of one or more user tagged content portions of the sample story, where the one or more user tagged content portions identify target content in the sample story and specify how to process the target content in a news story;
generate a set of rules based on the one or more user preferences, the set of rules useable to identify within the news story the target content and to direct processing of the target content within the news story by altering an appearance of the target content within the news story in accordance with the one or more user preferences;
populate a rules database based on the set of rules, wherein the rules database has one or more entries and each entry in the rules database includes at least a keyword field and an action field;
retrieve the news story;
detect a match between a keyword field of a first entry in the rules database and a portion of the news story;
filter the news story in response to detecting the match by directing control of the processor in accordance with an action field of the first entry of the rules database to alter an appearance of the target content within the news story in accordance with the rules database to generate a transformed news content; and
communicate the transformed news content to the user device.

14. The system of claim 13, further comprising:
instructions of the one or more instructions stored in the memory that, when executed by the processor, cause the processor to:
determine one or more of popularity, subject matter, and source of the news story.

15. The system of claim 13, further comprising:
instructions of the one or more instructions stored in the memory that, when executed by the processor, cause the processor to:
determine whether the news story represents business news, entertainment news, sports news, weather news, local news, or world news.

16. The system of claim 13, further comprising:
instructions of the one or more instructions stored in the memory that, when executed by the processor, cause the processor to:
store the transformed news content.

17. The system of claim 13, further comprising:
instructions of the one or more instructions stored in the memory that, when executed by the processor, cause the processor to:
determine whether the target content comprises one of a television show surprise ending and a sports score.

18. The system of claim 13, wherein the rules database further includes in each entry, a rule type field.

19. The system of claim 18, wherein multiple rule types can be associated with a single rule.

* * * * *